Feb. 6, 1951 W. H. NEWELL 2,540,989
MOTION REPRODUCING DEVICE
Filed Dec. 22, 1936 3 Sheets-Sheet 1
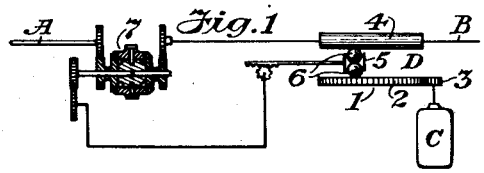
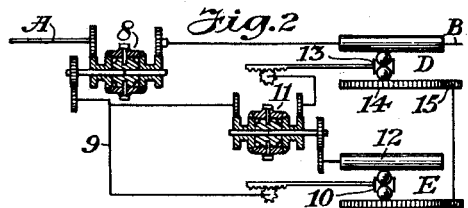
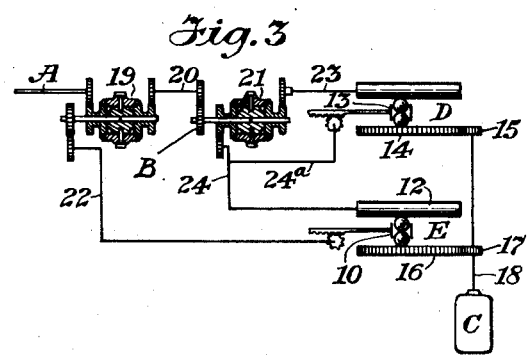
INVENTOR
William H. Newell
BY
Victor D. Borst
HIS ATTORNEY Feb. 6, 1951 W. H. NEWELL 2,540,989
MOTION REPRODUCING DEVICE
Filed Dec. 22, 1936 3 Sheets-Sheet 2
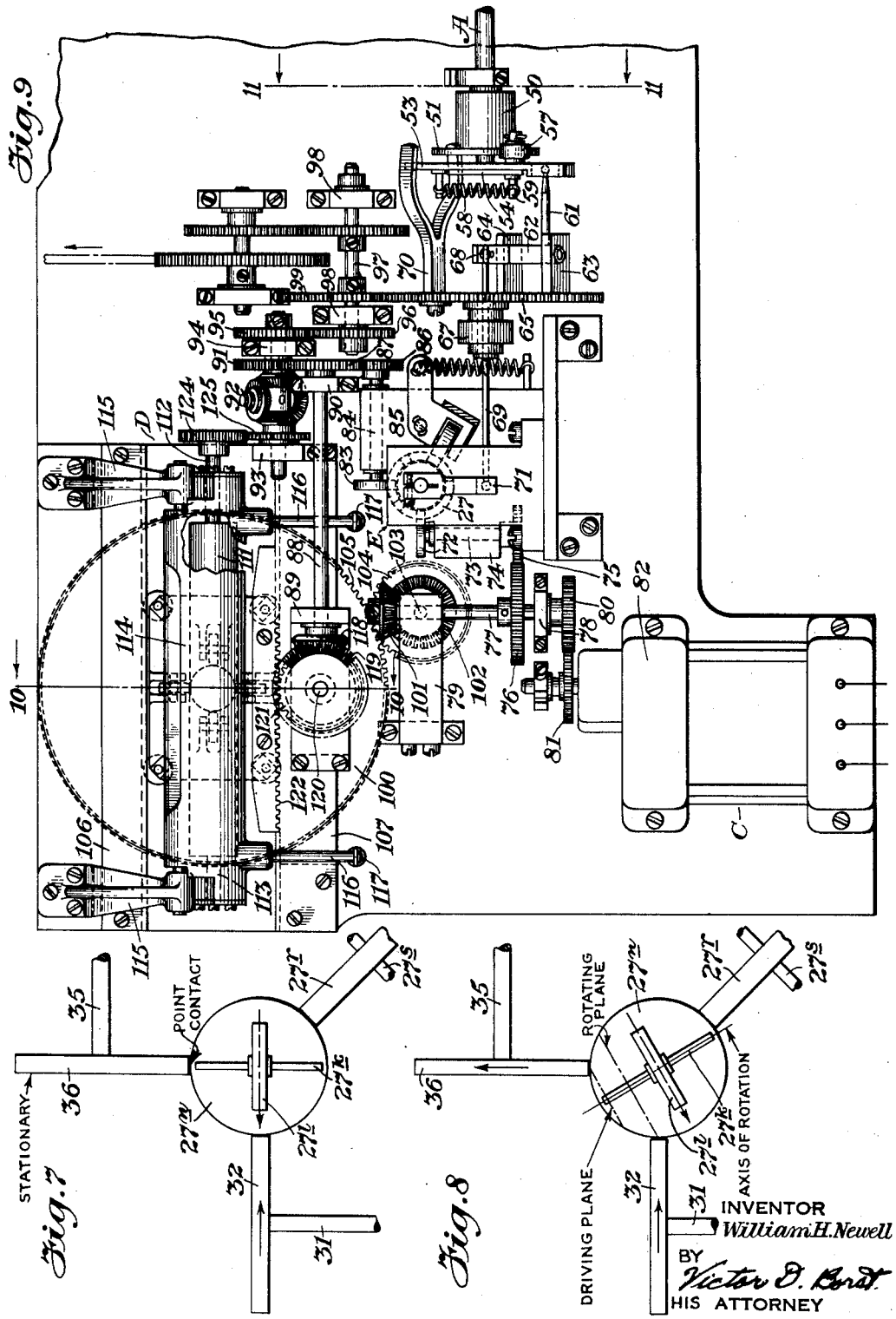
INVENTOR
William H. Newell
BY
Victor D. Borst
HIS ATTORNEY Feb. 6, 1951 W. H. NEWELL 2,540,989
MOTION REPRODUCING DEVICE
Filed Dec. 22, 1936 3 Sheets-Sheet 3
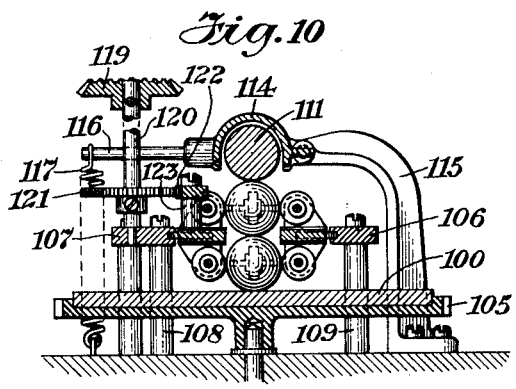
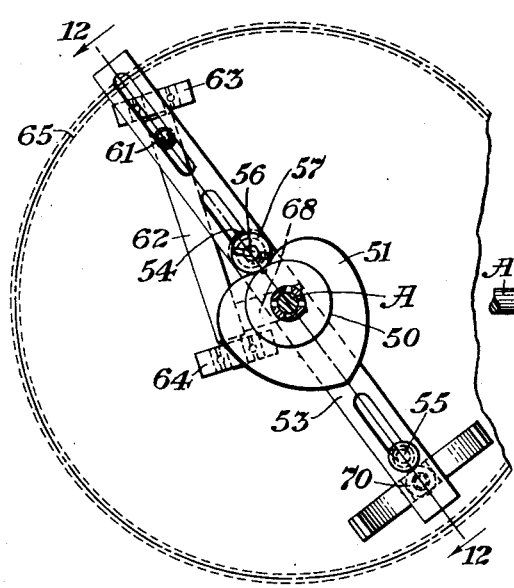
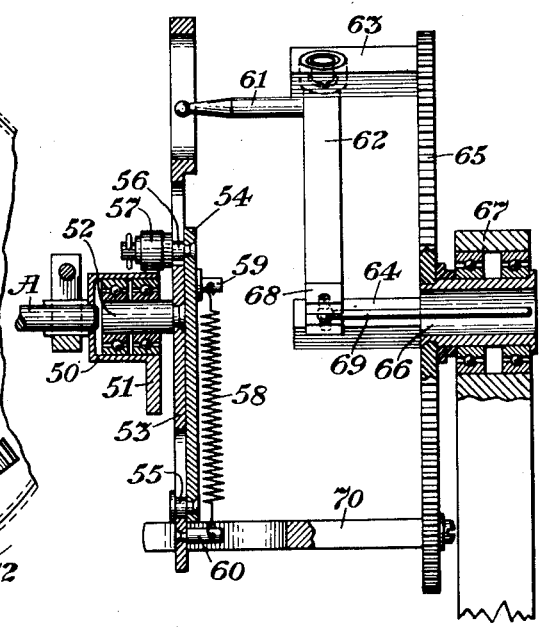
INVENTOR
William H. Newell
BY
Victor D. Borst
HIS ATTORNEY Patented Feb. 6, 1951

2,540,989

UNITED STATES PATENT OFFICE 2,540,989

MOTION-REPRODUCING DEVICE

William H. Newell, New York, N. Y., assignor to The Sperry Corporation, a corporation of Delaware Application December 22, 1936, Serial No. 117,155

8 Claims. (Cl. 74—388)

The invention herein disclosed relates to a motion-reproducing device in which the movement of one member is reproduced by another member, the latter member being actuated by a prime mover.

Motion-reproducing mechanisms of this type have various applications and they are particularly useful where it is desired to effect the movement of a member, a driven member, in accordance with the motion of another member, a motion-receiving member, but which requires more power than is available at the member the motion of which it is desired to reproduce. Various types of motion-reproducing devices have heretofore been devised, but in general such motion-reproducing devices operate by a control of the operation of the prime mover that drives the driven member in accordance with a reproduction of the motion of the motion-receiving member. In such motion-reproducing units the full torque of the prime mover is not available for driving the driven member because the speed of the prime mover is varied in accordance with variations in the speed of the motion-receiving member and the controls place a reaction torque upon the prime mover.

In accordance with this invention there is provided a motion-reproducing unit in which there is utilized a variable speed mechanism that interconnects the prime mover and the driven member. This variable speed mechanism is controlled in accordance with the difference in movement between the motion-receiving and driven members to effect the operation of the driven member in accordance with the motion-receiving member. In this motion-reproducing device the prime mover operates at substantially constant speed, and the full torque of the motor, with the exception of a limited reaction torque for operating the control of the variable speed mechanism, is available for driving the driven member. The design may be such that the driven member approaches the motion-receiving member with a transient function that is non-oscillating and follows the signal with an error that may be proportional to the velocity or to the acceleration of the output.

Several motion-reproducing devices embodying the invention are illustrated in the accompanying drawings in which:

Figs. 1 to 3 inclusive are diagrammatic illustrations of three motion-reproducing devices; Fig. 1 illustrates a device in which the driven member follows the motion-receiving member with an error proportional to the velocity of the driven member; Fig. 2 illustrates a device in which the driven member follows the motion-receiving member with an error proportional to the acceleration of the driven member; and Fig. 3 illustrates a modified form of the device shown in Fig. 2;

Figs. 4 to 8 inclusive illustrate the construction of a device similar to that illustrated in Fig. 1 but slightly modified, Fig. 4 being an isometric of the device, Fig. 5 being a section taken on the line 5—5 of Fig. 4, Fig. 6 being a section taken on the plane indicated by the parallel lines 6—6 on Fig. 4, and Figs. 7 and 8 being illustrations of two positions of the variable speed mechanism; and Figs. 9 to 12 inclusive illustrate the construction of a device similar to that illustrated in Fig. 3, Fig. 9 being a plan view thereof, Fig. 10 being a section taken on the line 10—10 of Fig. 9, Fig. 11 being a section taken on the line 11—11 of Fig. 9, and Fig. 12 being a section taken on the line 12—12 of Fig. 11.

The invention will first be described with reference to the diagrammatic illustrations, Figs. 1 to 3, and thereafter the constructional details of the devices illustrated in Figs. 4 to 12 will be described.

In general, the motion-reproducing devices illustrated in the drawings include a motion-receiving member A, the motion of which it is desired to reproduce, a driven member B that is driven in accordance with the motion-receiving member A, a prime mover C for driving the driven member and which operates at a constant speed, and a variable speed mechanism D interconnecting the prime mover and the driven member B and through which the driven member is operated. These are the essential elements of the devices illustrated in Fig. 1 and Figs. 4 to 8 of the drawings; the devices of the other figures of the drawings include another variable speed mechanism E as will hereinafter appear.

In Fig. 1, the motion-receiving and driven members are represented as shafts, the latter being driven from the prime mover C, through an integrator variable speed device D of a well known type. The variable speed mechanism includes a rotatably mounted plate 1 that is driven by a constant speed motor, the prime mover C, through a gear 2 formed on the edge of the plate and meshing with a gear 3 on the shaft of the motor. A roller 4 extends diametrically of the plate and is spaced therefrom. A ball carriage 5, movable diametrically of the plate, carries a pair of engaging balls 6 one of which engages the plate and the other of which engages the roller 4. The roller 4 is thus driven at a speed proportional to the displacement of the ball carriage from the center of the plate. The roller 4 is connected to drive the driven member B and it is also connected to one side of a differential 7, to the other side of which the motion-receiving member A is connected. The ball carriage is connected to the center of the differential 7 and thus operated in accordance with the difference in movement between the motion-receiving and driven members.

In this motion-reproducing device the driven member follows the motion-receiving member with an error that is proportional to the velocity of the driven member. This may be seen from the following. If the motion of the motion-receiving member is $\theta_o$ and $\theta$ is the motion of the driven member, the difference $(\theta_o - \theta)$ is used to position the ball carriage of the variable speed mechanism, therefore $$k\frac{d\theta}{dt} = (\theta_o - \theta)$$

or $$k\frac{d\theta}{dt} + \theta = \theta_o$$

from which it is seen that the error, when the motion-receiving and driving members are synchronized, is proportional to the velocity of the driven member, i. e.

$$k\frac{d\theta}{dt}$$

The solution of this equation consists of two parts, the complementary function and the particular integral. The complementary function is found by equating the left-hand side of the equation to zero and solving. The particular integral depends on the form of the input or movement of the motion-receiving member $\theta_o$. The complete solution is as follows:

$$\theta = Ae^{-\frac{1}{k}t} + U$$

in which A is a constant depending on the starting condition and U is the particular integral. If the motion-receiving member be fixed at zero the U would be zero and A would be the initial error at starting time 0. Since the exponent is negative this error decreases with an increase in time and approaches zero asymptotically and therefore there is no oscillation as the driven member approaches the motion-receiving member. The constant $k$ determines the speed at which the driven member will synchronize with the motion-receiving member and this is controlled by the gear ratios in the design of the device.

From the above it is seen that the arrangement illustrated in Figure 1 is non-oscillating, and the only reaction on the motion-receiving member is the movement of the ball carriage of the variable speed mechanism D. For some applications an error, between the motion-receiving and driven members, proportional to the velocity of the driven member is too great and for such applications a motion-reproducing device such as illustrated in either Figure 2 or Figure 3 is preferable.

In the device illustrated in Figure 2, the motion-receiving member and the driven roller of the variable speed mechanism are connected to a differential 8 and the center of the differential 8 operates a shaft 9 which is connected to move the ball carriage 10 of a variable speed mechanism E which is identical with the variable speed mechanism D. The shaft 9 is also connected to operate one side of a differential 11 and to the center of this differential the driven roller 12 of the variable speed mechanism E is connected. The other side of the differential 11 is connected to operate the ball carriage 13 of the variable speed mechanism D. The plate 14 of the mechanism D is driven by a gear 15 and the plate 16 of the mechanism E is driven by a gear 17. The gears 15 and 17 are mounted on the shaft 18 of the prime mover C. With this arrangement, if $y$ is the output or movement of the driven roller of the mechanism E, and, as before, $\theta_o$ is the movement of the motion-receiving member and $\theta$ is the movement of the driven member, the equations for this motion-reproducing device are as follows:

$$\theta_o - \theta = k\frac{dy}{dt} \qquad (1)$$

for variable speed device E; and $$\theta_o - \theta + r = k_1\frac{d\theta}{dt} \qquad (2)$$

for variable speed device D;
from Equation 2

$$y = k_1\frac{d\theta}{dt} + \theta - \theta_o$$

differentiating with respect to time $$\frac{dy}{dt} = k_1\frac{d^2\theta}{dt^2} + \frac{d\theta}{dt} - \frac{d\theta_o}{dt}$$

and substituting in Formula 1, we have $$\theta_o - \theta = kk_1\frac{d^2\theta}{dt^2} + k\frac{d\theta}{dt} - k\frac{d\theta_o}{dt}$$

or $$kk_1\frac{d^2\theta}{dt^2} + k\frac{d\theta}{dt} + \theta = k\frac{d\theta_o}{dt} + \theta_o$$

from which it is seen that the error between the motion-receiving and driven members is proportional to the acceleration of the driven member and that for conditions of constant velocity of the motion-receiving member, the motion-receiving and driven members are in positional agreement.

The solution of the equation for this form of motion-reproducing device is also made up of a complementary function and a particular integral. The complementary function describes the transient phenomena and is found by equating the left-hand side to zero. The particular integral describes the steady state condition and depends upon $\theta_o$ which is unknown. The complete solution is as follows:

$$\theta = Xe^{\left(\frac{-k+\sqrt{k^2-4kk_1}}{2kk_1}\right)t} + Ze^{\left(\frac{-k-\sqrt{k^2-4kk_1}}{2kk_1}\right)t} + U$$

where X and Z are constants dependent upon the starting conditions and U is the particular integral. X and Z may be found by forming a set of simultaneous equations, one of which is the above equation and the other its derivative with respect to time. Then given the original error and the velocity of the driven member, X and Z are determined. If $4kk_1$ is greater than $k^2$ then the exponents in the above equation will be imaginary and the transient function will therefore be oscillatory. If $k^2$ is greater than $4kk_1$ then one of the exponents will be greater than necessary and cause a longer synchronizing time. For the best application $k^2$ should be equal to $4kk_1$ in which case $$k^2=4kk_1$$
$$k=4k_1$$

Using this relation between the constants the original equation becomes $$4k_1^2\frac{d^2\theta}{dt^2}+4k_1\frac{d\theta}{dt}+\theta=4k_1\frac{d\theta_o}{dt}+\theta_o$$

In the motion-reproducting unit illustrated in Figure 2, the power required to drive the ball carriages of both of the speed responsive mechanisms D and E is taken from the motion-receiving member and places a reaction torque upon this member. The speed responsive devices may, however, be interconnected as illustrated in Figure 3 so that the ball carriage of only one speed responsive device is actuated by the motion-receiving member.

In the arrangement illustrated in Figure 3, the motion-receiving member is connected to one side of a differential 19, the other side of which is connected to a shaft 20 that extends between the differential 19 and a differential 21. The center of the differential 19 is connected by a shaft 22 to the ball bearing carriage of the speed responsive device E. The output of the speed responsive device D is connected to one end of differential 21 by shaft 23. The center or spider of the differential 21 is connected by shaft 20 to one end of differential 19. The other end of differential 21 is connected by shaft 24 to the output of the speed responsive device E. The shaft 24 is also connected to a shaft 24a through which the ball carriage of the speed responsive device D is operated. In the same manner as illustrated in Figure 2, the plates of the speed responsive devices D and E connected to the prime mover C.

In the manner disclosed in conjunction with the motion-reproducing device illustrated in Figure 2, it may be shown that the equation for the motion-reproducing unit of Figure 3 is identical with that for the motion-reproducing device shown in Figure 2. The motion-reproducing device of Figure 3 thus acts in the same manner as that disclosed in Figure 2 but it has the advantage that only the power necessary to operate the ball carriage of one of the speed responsive devices is taken from the motion-receiving member A.

In Figures 4 to 8 inclusive there is illustrated a motion-reproducing device similar to that disclosed in Figure 1. In the device illustrated in Figures 4 to 6 inclusive the motion-receiving member A is illustrated as a shaft which is connected to one side of a differential 25, and the center of the differential is connected to a relief cam drive 26. This relief cam drive includes a cylindrical constant rise cam 26a and a cam follower 26b. The cam follower 26b is mounted upon a member 26c that is rotatably mounted within the cylindrical cam 26a and the cam follower is urged against the surface of the cam, that is, the edge of the cylindrical cam, by a spring 26d. The member 26c is also connected to a shaft 27a of a variable speed device 27. This relief cam drive 26 is of the type illustrated and described in the copending application of Edward J. Poitras and James D. Tear, Serial No. 14,814, filed April 5, 1935, now Patent No. 2,134,488. However, any other form of relief cam drive may be used, as this is not an essential of the motion-reproducing device but is merely an auxiliary device for the purpose of relieving any strain due to sudden excess motions.

The speed responsive device 27 is of a single ball type and includes a ball case 27b that is formed as a hollow cylinder. In one end of the case there is secured a block 27d from which the shaft 27a extends. This block 27d constitutes a guide roller support and has mounted therein a shaft 27e upon which there is rotatably mounted a guide roller 27f. At the opposite end of the ball case 27b there is a block 27g from which a shaft 27h extends. Another block 27i is also mounted in this end of the casing. The block 27i is slidably mounted in the casing for movement longitudinally thereof but it is secured against relative rotational movement by a pin 27j. The block 27i constitutes a guide roller support and has secured therein a shaft 27k upon which a guide roller 27l is rotatably mounted. Between the block 27g and the block 27i there is a spring 27m which urges the block 27i towards the block 27d. Between the blocks 27i and 27d there is a ball 27n and the guide rollers 27f and 27l press against the ball 27n at diametrically opposite points. Since the axes of these guide rollers are fixed with reference to the ball case, the ball is constrained to rotate about an axis extending diametrically of the ball case and parallel to the axes of the shafts 27e and 27k which axis of rotation of the ball is fixed with reference to the ball case. The shafts 27a and 27h are journaled in standards 28 and 29 extending from a base and constituting a part of the frame of the motion-reproducing device. The ball case has slots 27o and 27p through which driving and driven rollers contact with the ball.

Rotatably mounted in a block 30, secured to the base, there is a shaft 31 which carries at its upper end a roller 32 that engages the ball 27n through the slot 27o. At the lower end the shaft 31 carries a bevel gear 32' which meshes with a bevel gear 33 mounted upon the shaft of the prime mover C. Through this arrangement, the prime mover C rotates the shaft 31 and the driving roller 32 which drives the ball.

In a block 34, there is mounted a shaft 35, the block likewise being secured to the base. The shaft 35 carries a driven roller 36 which engages the ball 27n at a point 90° displaced from the point at which the driving roller 32 engages the ball. The shaft extends through the block and represents the driven member B of the motion-reproducing device. On this shaft B there is secured a bevel gear 37. The bevel gear 37 meshes with a bevel gear 38 secured on a shaft 39 rotatably mounted in a bearing bracket 40 extending from the block 34. The shaft 39 carries a pinion 41 which meshes with a gear 42 mounted upon a shaft 43 that is rotatably mounted in a pair of bearing brackets 44 extending from the base. The shaft 43 carries a gear 45 which meshes with a gear that is connected to one side of the differential 25.

The ball case also has a slot 27q through which a roller 27r extends and engages the ball. The roller 27r is rotatably mounted upon a shaft 27s that is secured in one end of a double arm lever 27t. The lever 27t is pivotally mounted on the block 34 and a spring 27u acts between a pin 27v and the other arm of the lever 27t. The spring 27u thus resiliently acts upon the roller 27r which, as will be seen from Figure 5, engages the ball at a point that is substantially at the bisector of the obtuse angle between the driving and driven rollers 32 and 36. The roller 27r thus causes a pressure contact between the driving and driven rollers and the ball.

In operation, the prime mover or electric motor C is operating at a constant speed. When there is no motion of the motion-receiving member A, the relation of the elements of the speed responsive device C is as shown in Figure 7. In this figure the guide rollers 27f and 27l represented by the guide roller 27l are positioned such that the ball is caused to rotate about an axis that is in the plane of the driven roller 36 and perpendicular to the axis of the driven roller. The driving roller 32 thus causes the ball to rotate about this axis and consequently there is no rotation of the driven rollers 36. As the motion-receiving member A is rotated, its rotation, since there is no rotation of the driven roller 36, is transmitted through the differential 25 to the shaft 27a of the variable speed device. Rotation of the shaft 27a causes a rotation of the ball case and consequently changes the relation of the axis of rotation of the ball with respect to the driving and driven rollers. This relation is shown in Figure 8 in which the ball case has been so rotated that the axes of rotation of the guide rollers makes an angle with both the planes of rotation of the driving and driven rollers. When this condition exists, there is then rotation of the driven roller 36 as is clearly indicated in Figure 8. In this relation, the driving roller rotates the ball through the rotating plane indicated by the broken line and the driven roller is rotated at the driving plane indicated by another broken line. As the ball is thus rotated the driven roller 36 is operated, and through shaft 35 and the gear train 37, 38, 41, 42 and 45 operates the other side of the differential 25 and the driven roller 36 is thus caused to operate at a velocity that is the same as the velocity of the motion of the motion-receiving member A.

The advantage of using the variable speed device illustrated in Figures 4, 5 and 6 is that the only load on the motion-receiving member A is that produced by two unloaded bearings which support the ball case and the friction of the point contacts of the ball in line with the axis of the ball case. As will be appreciated, this is a very light load. This variable speed mechanism may be also used in the devices such as those illustrated diagrammatically in Figs. 2 and 3.

In Figures 9 to 12 inclusive there is disclosed a motion-reproducing device similar to that illustrated in Figure 3. The motion-reproducing device in Figures 9 to 12 inclusive differs from that illustrated in Figure 3 in that the speed responsive device E is of the type utilized in the motion-reproducing unit in Figures 4 to 8 inclusive. The variable speed device D, however, is of the two-ball integrator type similar to those illustrated diagrammatically in Figures 1 to 3. In this motion-reproducing device, the motion-receiving member A is illustrated as a shaft. The shaft A is rigidly coupled to a cup-shaped member 50 that carries a heart-shaped cam 51 that is integral with the cup-shaped member. The heart-shaped cam 51 is a constant rise cam and forms one part of a relief coupling. Within the cylindrical cup-shaped member there is journaled a stud 52 that projects from a rotatable arm 53 that extends in opposite directions from the stud. Mounted on the arm 53 there is a radial slide 54 which carries a guide pin 55 extending through a slot in the arm and a pin 56 which extends through another slot in the arm. The pin 56 carries a cam follower 57 which engages the cam 51. The slide 54 is resiliently urged in a direction to maintain the cam follower 57 in engagement with the cam 51 by a spring 58 one end of which is secured to a pin 59 extending from the slide 54 and the other end of which is secured to a pin 60 extending from the arm 53.

Adjacent one end of the arm 53, there is a slot extending through the arm and in this slot there is received the end of a rod 61. The end of the rod 61 within the slot is spherically shaped and engages the sides of the slot. The rod 61 is rigid with and extends perpendicularly from a bar 62 that is journaled in spaced brackets 63 and 64 which extend from and are secured to a gear 65 mounted upon a hollow shaft 66 that is journaled in a bearing bracket 67. The bar 62 has a rigid arm 68 which is secured by means of a ball joint to a rod 69 which extends through the hollow shaft 66. Also extending from the gear 65 there is a bifurcated arm 70 between the arms of which one end of the arm 53 is received. The bifurcated bracket 70 is provided to limit the relative movement between the gear 65 and the arm 53. With this arrangement, it will be seen that movement of the motion-receiving member or shaft A causes a rotational movement of the arm 53. When the arm 53 rotates relative to the gear 65, it effects rotation of the bar 62 through the rod 61. Rotation of the bar 62 swings the arm 68 and causes movement of the rod 69 longitudinally of the shaft 66.

The rod 69 is connected to the ball carrier of the variable speed mechanism E. This variable speed mechanism is similar in all respects to that disclosed in Figures 4 to 8 inclusive. The rod 69 is directly connected to the shaft of the ball carrier by a lever 71 as there is no necessity for an intermediate relief coupling. The driving roller 72 of the variable speed mechanism E is mounted upon a shaft 73 that is journaled in the block 74. The shaft 73 also carries a gear 75 which meshes with a gear 76 mounted upon a shaft 77. The shaft 77 is journaled in bearing brackets 78 and 79 and to one end of the shaft there is secured a gear 80 which meshes with a gear 81 mounted upon the shaft of a constant speed motor 82, the prime mover C. The driven roller 83 of the variable speed mechanism E is mounted upon a shaft 84 journaled in a block 85. On the opposite end of the shaft 84 there is mounted a gear 86 which meshes with a gear 87 mounted upon a shaft 88 that is journaled in bearing brackets 89 and 90. Also meshing with the gear 87 is a gear 91 that is fast to one side of a differential 92. The center or spider shaft of the differential is journaled in bearing blocks 93 and 94 and the shaft carries a gear 95 which meshes with a gear 96 mounted upon a shaft 97 that is journaled in bearing blocks 98. The shaft 97 also carries a gear 99 which meshes with the gear 65 so that the gear 65 is driven through the train of mechanism just described in accordance with the displacement of the center of the differential 92, one side of which is driven by the driven roller of the variable speed mechanism D.

The other side of the differential 92 is connected to the output of an integrator type of variable speed mechanism D. The plate 100 of the variable speed mechanism D is driven by the motor 82 through a bevel gear 101 that is mounted on the shaft 77. The bevel gear 101 meshes with a bevel gear 102 mounted upon a shaft 103. The shaft 103 also carries a spur gear 104 which meshes with a gear 105 that carries and is secured to the plate 100. The plate 100 is thus continuously rotated by the motor 81.

The shaft 88 moves the ball carriage of the variable speed mechanism D. This ball carriage is mounted between guides 106 and 107 that are mounted on posts 108 and 109 extending from the base. The ball carriage consists of a plate having four pairs of brackets on each of the opposite sides of the plate. Each pair of brackets carries an idler guide roller, the roller on one side of the plate engaging a ball at four points spaced 90° apart and the rollers on the other side of the plate engaging another ball in a similar manner. The two balls are in contact and one ball bears upon the plate 100 and the other ball engages a roller 111. The roller 111 is a solid roller and has reduced portions 112 and 113 which are journaled in bearings formed in a housing 114 in which the roller 111 is mounted. The housing 114 is pivotally secured to brackets 115 that extend from the base. Extending from the housing 114 there are rods 116 to which ends of springs 117 are connected. The other ends of the springs 117 are connected to the base. The springs thus act to effect a pressure engagement between the roller and the ball adjacent thereto and also a pressure engagement between the two balls and the other ball and the plate.

The ball carriage is moved along the guides and longitudinally of the roller 111 by rotation of the shaft 88. On the end of the shaft 88 there is mounted a bevel gear 118 which meshes with a bevel gear 119. The latter gear is mounted on a shaft 120 extending from and journaled in the guide bracket 107 and another bearing (not shown). The shaft 120 carries a pinion 121 that meshes with a rack 122 that is secured to posts 123 extending from the ball carriage. Through this train of mechanism it will be seen that rotation of the shaft 88 effects rotation of the pinion 121 and thus movement of the ball carriage. As previously explained, when the ball carriage is moved off the center of the plate, rotation of the balls is effected and through the balls rotation of the roller 111 is effected. The speed of the rotation of the roller 111 depends upon the extent of movement of the balls of the ball carriage off from the center of the rotating plate. As previously stated, the roller 111 is connected to one side of the differential 92. This connection is effected through a gear 124 mounted upon the shaft 112. The gear 124 meshes with a gear 125 which is rigidly combined with one side of the differential 92.

From the above description of the mechanism shown in Figures 9 to 12 inclusive it will be seen that when there is relative movement between the motion-receiving shaft A and gear 65, the rod 69 will be moved so that the ball carriage of the variable speed mechanism E will be rotated to effect rotation of the driven roller 83. The speed of rotation of the driven roller will, of course, be proportional to the amount of lever 71 is displaced from the position in which it is illustrated in Figure 9. Upon rotation of the driven roller 83, the ball carriage of the variable speed mechanism D will be shifted to effect rotation of the roller 111. Motion from the roller 111 is introduced into one side of the differential 92 and motion from the driven roller 83 is introduced into the other side of the differential 92 and the gear 65 is rotated in accordance with the displacement of the center of the differential. It will thus be seen that this mechanism is in all respects like that disclosed in Figure 3. It will of course be apparent that a variable speed mechanism of the two-ball integrator type may be utilized in place of the variable speed mechanism E. However, the variable speed mechanism E has those advantages that were heretofore mentioned and the operation of the motion-reproducing unit is the same regardless of which type of variable speed mechanism is used providing the constants, that is, the gear ratios, are properly chosen in the manner described above.

From the above description of the devices illustrated in the drawings it will be seen that these motion-reproducing devices are aperiodic and that the devices may be made, for example, the ones illustrated in Figures 1 and 4 to 8, such that the driven member follows the motion-receiving member with an error that is proportional to the velocity of the driven member, or for example, those shown in Figures 2, 3 and 9 to 12, in which the driven member follows the motion-receiving member with an error that is proportional to the acceleration. Both types of devices function smoothly and by the proper choice of constants the driven member may be quickly brought into synchronism with the motion-receiving member while retaining the aperiodic quality of the motion-reproducing unit.

It will be obvious that various other modifications and changes may be made by those skilled in the art in the embodiments of the invention illustrated in the drawings and described above within the principle and scope of the invention as expressed in the appended claims.

I claim:

1. In a motion-reproducing device, a motion-receiving member, a driven member and means for reproducing in the driven member the movements of the motion-receiving member comprising a differential interconnecting the motion-receiving and driven members, a prime mover, a variable speed mechanism interconnecting the prime mover and the driven member, another variable speed mechanism, means connected to said differential for effecting operation of said last mentioned variable speed mechanism, and means for effecting the operation of said first mentioned variable speed mechanism differentially connected for operation in accordance with the output of said second mentioned variable speed mechanism and the difference in movement between the motion-receiving and driven members.

2. In a motion-reproducing device, a motion-receiving member, a driven member and means for reproducing in the driven member movements of the motion-receiving member comprising a differential interconnecting the motion-receiving and driven members, a prime mover, a variable speed mechanism interconnecting the prime mover and the driven member, another variable speed mechanism, means connected to said differential for effecting operation of said last mentioned variable speed mechanism in accordance with the difference in movement between the motion-receiving and driven members, and means for controlling the operation of the first mentioned variable speed mechanism including a second differential connected to effect the operation of said first mentioned variable speed mechanism in accordance with the difference between the output of the first mentioned differential and the output of the second variable speed mechanism.

3. In a motion-reproducing device, a motion-receiving member, a driven member and means for reproducing in the driven member movements of the motion-receiving member comprising a differential interconnecting the motion-receiving and driven members, a prime mover, a variable speed mechanism interconnecting the prime mover and the driven member, another variable speed mechanism, means connected to said differential for effecting operation of said last mentioned variable speed mechanism in accordance with the difference in movement between the motion-receiving and driven members, and means for controlling the operation of the first mentioned variable speed mechanism including a differential connected to effect the operation of said first mentioned variable speed mechanism in accordance with the difference in motion between (1) the output of the second variable speed mechanism and (2) the difference in motion between the motion-receiving member and the driven member.

4. In a motion-reproducing device, comprising in combination a motion-receiving member, a driven member, two variable speed mechanisms each having a control element for adjusting the speed of the output, a substantially constant speed prime mover connected to drive said mechanisms, a differential connecting said receiving member and said driven member and having an output connected to transfer the difference in motion between said members to position the control element of one of said variable speed mechanisms, a second differential, means connecting the output of said variable speed mechanism to position the control element of the second variable speed mechanism, and one member of the second differential, and means connecting the other two members of the second differential to the output of the second variable speed mechanism and the driven member.

5. In a mechanism of the type described, means for effecting linear movement of a control element in accordance with the difference between two rotative movements comprising a rotatably mounted member adapted to receive one of said rotary movements, a slotted arm resiliently connected to said member and adapted to rotate therewith, a second rotatably mounted member spaced therefrom and adapted to receive the second of said movements, a rotatably mounted element mounted on the second rotatably mounted member and adapted to rotate about an axis in a plan parallel to the plane of rotation of the second rotatably mounted member, a pin fixed at one end of said element and adapted to slide in a slot of said arm and a second pin fixed to said element along the axis thereof, said second pin being connected to said control element.

6. In a mechanism of the type described, means for effecting linear movement of a control element in accordance with the difference between two rotative movements comprising a rotatable cam mounted to receive one of said movements, a slotted arm adapted to rotate in the center portion of said cam, a second arm carrying a cam follower engaging said cam and adapted to slide longitudinally on said first arm, resilient means for keeping said cam follower in contact with said cam, a second rotatably mounted member spaced therefrom and adapted to receive the second of said movements, a rotatably mounted element mounted on the second rotatably mounted member and adapted to rotate about an axis in a plane parallel to the plane of rotation of the second rotatably mounted member, a pin fixed at one end of said element and adapted to slide in a slot of said first arm and a second pin fixed to said element along the axis thereof, and means for connecting the other end of said second pin to the said control element.

7. In a motion-reproducing device, comprising in combination a motion-receiving member, a driven member, two variable speed mechanisms each having a control element for adjusting the speed of the output, a substantially constant speed prime mover connected to drive said mechanisms, a differential connecting said motion-receiving member and said driven member and having an output connected to transfer the difference in motion between said members to position the control element of one of said variable speed mechanisms, means connecting the output of said variable speed mechanism to position the control element of the second variable speed mechanism, and means connecting the output of the second variable speed mechanism to actuate the driven member.

8. In a motion-reproducing device, comprising in combination a motion-receiving member, a driven member, two variable speed mechanisms each having a control element for adjusting the speed of the output, a substantially constant speed prime mover connected to drive said mechanisms, a differential connecting said motion-receiving member and said driven member and having an output connected to transfer the difference in motion between said members to position the control element of one of said variable speed mechansims, a second differential, means connecting the output of said variable speed mechanism to position one member of the second differential, means connecting the other two members of the second differential to the output of the first differential and the control element of the second variable speed mechanism respectively, and means connecting the output of the second variable speed mechanism to actuate the driven member.

WILLIAM H. NEWELL.

REFERENCES CITED

The following references are of record in the file of this patent:

UNITED STATES PATENTS

| Number | Name | Date |
| --- | --- | --- |
| 1,428,326 | Fay | Sept. 5, 1922 |
| 1,468,712 | Ford | Sept. 25, 1923 |
| 1,544,646 | Johnson | July 7, 1925 |
| 1,906,831 | Baker et al. | May 2, 1933 |
| 1,919,191 | Bates | July 25, 1933 |
| 2,026,912 | Procofieff-Seversky | Jan. 7, 1936 |
| 2,049,375 | Henderson | July 28, 1936 |
| 2,136,213 | Hodgman | Nov. 8, 1938 |

FOREIGN PATENTS

| Number | Country | Date |
| --- | --- | --- |
| 403,696 | Germany | Oct. 2, 1924 |